United States Patent
Crocco et al.

(10) Patent No.: US 10,006,998 B2
(45) Date of Patent: Jun. 26, 2018

(54) METHOD OF CONFIGURING PLANAR TRANSDUCER ARRAYS FOR BROADBAND SIGNAL PROCESSING BY 3D BEAMFORMING AND SIGNAL PROCESSING SYSTEMS USING SAID METHOD, IN PARTICULAR AN ACOUSTIC CAMERA

(71) Applicant: FONDAZIONE ISTITUTO ITALIANO DI TECNOLOGIA, Genoa (IT)

(72) Inventors: Marco Crocco, Genoa (IT); Andrea Trucco, Genoa (IT); Vittorio Murino, Rapallo (IT)

( * ) Notice: Subject to any disclaimer, the term of this patent is extended or adjusted under 35 U.S.C. 154(b) by 367 days.

(21) Appl. No.: 14/654,416
(22) PCT Filed: Jan. 22, 2014
(86) PCT No.: PCT/IB2014/058466
§ 371 (c)(1),
(2) Date: Jun. 19, 2015
(87) PCT Pub. No.: WO2014/115088
PCT Pub. Date: Jul. 31, 2014

(65) Prior Publication Data
US 2015/0346338 A1    Dec. 3, 2015

(30) Foreign Application Priority Data
Jan. 24, 2013   (IT) .............................. GE2013A0009

(51) Int. Cl.
*G01S 15/89* (2006.01)
*G10K 11/34* (2006.01)
(Continued)

(52) U.S. Cl.
CPC ............ *G01S 15/89* (2013.01); *G10K 11/341* (2013.01); *H04R 1/406* (2013.01); *H04R 3/005* (2013.01);
(Continued)

(58) Field of Classification Search
CPC ............ G01S 7/52046; G01S 15/8927; G10K 11/346; G06T 5/002; G06T 5/009; G06T 2207/10132
See application file for complete search history.

(56) References Cited

U.S. PATENT DOCUMENTS

2009/0299184 A1* 12/2009 Walker ................ G01S 7/52046
600/447

OTHER PUBLICATIONS

Ina Kodrasi et al: "Microphone position optimization for planar superdirective beamforming", Acoustics, Speech and Signal Processing (ICASSP), 2011 IEEE International Conference on, IEEE, May 22, 2011 (May 22, 2011), pp. 109-112, XP032000675, DOI: 10.1109/ICASSP.2011.5946340 ISBN: 978-1-4577-0538-0 The whole document.

(Continued)

*Primary Examiner* — Luke D Ratcliffe
(74) *Attorney, Agent, or Firm* — Themis Law

(57) ABSTRACT

A method of configuring planar transducer arrays for broadband signal processing by 3D beamforming, wherein a superdirective beamforming technique for low-frequency signal components is combined with a sparse and aperiodic array pattern for high-frequency components in a predetermined frequency range, and wherein the positions of the individual transducers at the aperture of the array and the FIR filter coefficients are further optimized in parallel, by a hybrid iterative process including an analytical calculus for determining the FIR filter coefficients and a stochastic calculus for determining the transducer positions at the aperture of the planar transducer arrays, by minimization of a cost function.

10 Claims, 8 Drawing Sheets

(51) Int. Cl.
    *H04R 1/40*    (2006.01)
    *H04R 3/00*    (2006.01)
(52) U.S. Cl.
    CPC .. *H04R 2201/401* (2013.01); *H04R 2201/405* (2013.01)

(56)        References Cited

OTHER PUBLICATIONS

Zhi Guo Feng et al: "Placement Design of Microphone Arrays in Near-Field Broadband Beamformers", IEEE Transactions on Signal Processing, IEEE Service Center, New York, NY, US, vol. 60, No. 3, Mar. 1, 2012 (Mar. 1, 2012), pp. 1195-1204, XP011411701, ISSN: 1053-587X, DOI: 10.1109/TSP.2011.2178491 The whole document.

Trucco A: "Synthesis of aperiodic planar arrays by a stochastic approach", Oceans '97. MTS/IEEE Conference Proceedings Halifax, NS, Canada Oct. 6-9, 1997, New York, NY, USA,IEEE, US, vol. 2, Oct. 6, 1997 (Oct. 6, 1997), pp. 820-825, XP010246084, DOI: 10.1109/OCEANS.1997.624100 ISBN: 978-0-7803-4108-1 The whole document.

Marco Crocco et al: "Stochastic and Analytic Optimization of Sparse Aperiodic Arrays and Broadband Beamformers With Robust Superdirective Patterns", IEEE Transactions on Audio, Speech and Language Processing, IEEE Service Center, New York, NY, USA, vol. 20, No. 9, Nov. 1, 2012 (Nov. 1, 2012), pp. 2433-2447, XP011471466, ISSN: 1558-7916, DOI: 10.1109/TASL.2012.2203808 The whole document.

* cited by examiner

US 10,006,998 B2

METHOD OF CONFIGURING PLANAR TRANSDUCER ARRAYS FOR BROADBAND SIGNAL PROCESSING BY 3D BEAMFORMING AND SIGNAL PROCESSING SYSTEMS USING SAID METHOD, IN PARTICULAR AN ACOUSTIC CAMERA

The present invention relates to a method of configuring planar transducer arrays for broadband signal processing by three-dimensional beamforming, which implements a combination of a superdirective beamforming technique for low-frequency signal components and a sparse aperiodic array arrangement for high-frequency components, considering a predetermined range of frequencies.

Namely, the invention relates to a method of configuring planar transducer arrays for broadband signal processing by filter-and-sum three-dimensional beamforming.

BACKGROUND OF THE INVENTION

In 3D, i.e. three-dimensional, beamforming systems, a beam is generated and deviated in various directions to scan a given portion of space, these beamforming systems are possibly used both for transmitting and receiving signals and may generate one beam at a time or multiple beams at the same time [1].

When the spectra of the signals to be processed comprise an excessively wide range, as it frequently occurs with passive systems, a so-called "filter-and-sum" beamforming technique is used, to optimize performances over the whole range of frequencies [2]. In these cases, in order to obtain the desired functions and avoid excessive complexity and costs, both the design of the planar or volumetric array and the FIR (Finite Impulse Response) filters must be appropriately configured.

When the range of frequencies becomes very wide, such as for sound wave processing, two distinct problems arise: on the one hand, in the lower portion of the frequency band, the wavelength is comparable to or greater than the aperture of the transducer array. This considerably reduces the directivity of the array. On the other hand, in the band portions with higher frequencies, the shorter wavelengths require a considerable number of transducers to be positioned at the aperture of the transducer array, to prevent space subsampling. Both problems may be addressed at the same time by the so-called superdirective beamforming technique at low frequencies, and by the use of sparse aperiodic transducer arrays at high frequencies.

The theory of superdirectivity is known [4-7] and involves solutions that afford increased directivity of the transducer array as compared with the directivity that can be obtained by uniform weighting. Nevertheless, the application of this theory to real systems has been long prevented by the inadequate robustness of this solution, due to the imperfections of the transducer array and to randomly fluctuating characteristics of the transducers.

Certain methods are known in the art for designing superdirective beamformers that might ensure adequate robustness in view of practical applications. Nevertheless, while the use of superdirectivity for broadband signal processing by filter-and-sum beamforming has become rather widespread [8, 9, 11-18], the application of superdirectivity to planar arrays has been considered much less frequently [10, 18].

Aperiodically arranged transducer arrays [4] may be used to prevent the occurrence of undesired lobes (known as grating lobes) when the distance between transducers is greater than half the wavelength. Various methods have been suggested in the art for synthesis of sparse aperiodic transducer arrays, with configurations obtained by analytic, stochastic or hybrid approaches, involving techniques based on simplex algorithms [19] and compressive sampling techniques [20, 21], as well as the use of genetic algorithms [22, 23], simulated annealing [24, 25] and many other optimization strategies [26-29].

In spite of what has been suggested in the art, broadband signal processing by filter-and-sum beamforming, in combination with the use of a planar transducer array having a sparse aperiodic arrangement of transducers has been rarely considered [30, 31].

Furthermore, while both the theory of superdirectivity and aperiodic configurations of transducer arrays have been known in the art, they have been basically considered as two distinct techniques.

In document [30], the configuration of planar transducer arrays is limited to two special cases, involving two-dimensional apertures, i.e. two-dimensional apertures in which transducers are placed on radial lines and two-dimensional apertures that may be separated into distributions corresponding to two one-dimensional apertures. Furthermore, this document only considers beam patterns that are invariant with respect to frequency.

On the other hand, in document [31] filter coefficient optimization and transducer placement are determined by sequential quadratic programming. Each time that a transducer is displaced, the beam pattern has to be calculated at each node of a grid that is used to discretize the three-dimensional domain of this beam pattern (frequency and two angles or lengths). Excessive increase of computational load is avoided by limiting the number of transducers and selecting a rough pitch for the discretization grid. When considering a high subsampling factor in combination with tens of transducers, the side lobes become so steep that fine discretization steps are required for accurate beam pattern estimation. Nevertheless, in this case the method of document [31] is not applicable. Furthermore, the methods of both documents [30] and [31] do not consider the synthesis of a transducer array that is required to be robust and superdirective for a significant portion of the frequency band.

Document [18] suggests a robust and superdirective planar transducer array, whose average directivity is maximized by operating both on transducer position and on FIR filter coefficients. Since directivity determination does not require full beam pattern calculation, the cost function is calculated using a discretized grid which combines the frequency axis with all the possible beam steering directions.

The method as described in document [18] cannot be practically used for configuration of a planar transducer array when the frequency range is very high and both transducer position and frequency response of the FIR filters are required to be optimized, for two reasons: at the high frequencies of the relevant range, average directivity maximization without a sidelobe control mechanism is insufficient to avoid undesired lobe or very high minor lobes; a special set of FIR filters is defined for each steering direction, which is unacceptable when considering great numbers of steering directions. This also causes a considerable increase of the computational load.

Document [3] describes a configuration method for a linear transducer array which involves contextual optimization of the position of transducers and FIR filters. The method involves the configuration of an aperiodic linear array and a broadband superdirective beamformer. Nevertheless, since optimization is carried out by minimization of a cost function that has to be recalculated multiple times on a discretization grid for discretization of the beam pattern domain, this technique cannot actually be extended to the planar array situation, due to the huge computational load required therefor. Furthermore, the broadband configuration cannot be divided into a plurality of independent problems having a narrower band, as all the narrower bands will be required to have the same optimized transducer array configuration.

SUMMARY OF THE INVENTION

The object of the present invention is to provide a method of configuring planar transducer arrays for broadband signal processing by three-dimensional beamforming as described above, which allows optimization of both the position of transducers and the response frequencies of the FIR filters used for filter-and-sum beamforming.

A further object of the invention is to ensure that the optimized FIR filters will maintain their validity for any steering direction and hence that the steering direction may be set by only acting upon signal delays, while maintaining the configuration of the transducer array and the FIR filters unchanged.

Particularly, the present invention is directed to a method of configuring a planar transducer array for a three-dimensional beamforming system that is data-independent and allows substantial processing of far-field signals, and the spectrum comprises a wide range of frequencies. This range of frequencies being so wide as to require robust superdirective beamforming to increase directivity at low frequencies and a sparse aperiodic transducer array design to avoid grating lobes at high frequencies.

Typically, these conditions are found in passive acoustic imaging systems, which are also known as "acoustic camera". These devices are designed for mapping active acoustic sources in a predetermined three-dimensional region both in air and underwater.

For example, in air, advantages are obtained by processing signals having frequencies from a few tens of hertz to a few kilohertz using a limited number (typically a few tens) of microphones arranged at an aperture whose size is of the order of one meter. Since the wavelengths range from a few centimeters to a few meters, a method is required that ensures both superdirectivity and sparse and aperiodic arrangements of transducers.

The invention obviates the above drawbacks by providing a method of configuring planar transducer arrays for broadband signal processing by three-dimensional beamforming, wherein a superdirective beamforming technique for low-frequency signal components is combined with a sparse aperiodic array pattern for high-frequency components in a predetermined frequency range, and wherein the positions of the individual transducers at the aperture of the array and the FIR filter coefficients are further optimized in parallel, by a hybrid iterative process including an analytical calculus for determining the FIR filter coefficients and a stochastic calculus for determining the transducer positions at the aperture of the planar transducer arrays, by minimization of a cost function wherein:

the cost function expresses the beam pattern as a function of the FIR filter coefficients and the position of the transducers at the aperture of the planar transducer array and consists of a triple integral over the frequency range and over the range of values of two variables, i.e. the linear combination of each of the two components of the vectors that define the beam-steering direction, and the direction of the vector perpendicular to the incident wavefront;

parallel minimization of the cost function with respect to the transducer positions and the FIR filter coefficients;

said minimization is carried out in parallel and iteratively, using a stochastic method for transducer positions and an analytical method for FIR filter coefficients;

and said cost function being expressed by transformation and replacement of variables with two functions independent of the individual transducer positions, said functions having values that are determined on a predetermined grid with a given density of nodes before starting minimization, are stored in a table and are read from said table for computation of the cost function during the minimization process.

As more clearly shown in the mathematical proof given in the disclosure, the invention is based on the finding that, by expressing the beam pattern energy as a triple integral with respect to frequency and to the value ranges of two variables that express the combination of the components of the unit vector that define the beam-steering direction and the direction perpendicular to the wavefront originating from the point coinciding with the wave source, said integral may be expressed with the values of two integral functions that are independent of the positions of the transducers.

Parallel cost function minimization based on FIR filter coefficients and transducer positions, using an analytical method for the filter coefficients and a stochastic method for the positions still implies a considerable computational load and would be impracticable, although parallel iterative optimization of filter coefficients by an analytical method and of transducer positions by a stochastic method is a progress as compared with prior art methods in which optimization is calculated separately for filter coefficients and transducer positions. Without the computational simplification introduced by the invention, triple integral calculation would have to be repeated at each transducer position, which would make the method practically unfeasible.

In a further aspect of the invention, which improves the above method in view of increasing computational robustness against imperfections and inaccuracies of transducers, the method of the invention combines the cost function with a probability density function for the characteristics of the transducers based on a complex time- and frequency-invariant variable, and considers the average cost function value.

This error probability density function for the characteristics of the transducers adds robustness of the method against dispersion of transducer characteristics.

A further characteristic is the introduction of the condition that the beam pattern modulus in the beam steering direction shall be 1 and that the phase has a linear behavior. Thus, the signal that comes from the steering direction is only delayed, and is neither attenuated nor distorted.

Due to the above, the method of the present invention maintains its validity for any steering direction that falls within a predetermined three-dimensional sector, which makes the method suitable for passive imaging applications.

Concerning transducer position optimisation, any stochastic method may be used, such as genetic algorithms, ant colony optimization, particle swarm, differential evolution algorithms and other iterative algorithms.

In a preferred, non-limiting exemplary embodiments, the present invention uses simulated annealing, as described below in greater detail.

Further improvements or details of the method steps will be detailed hereinbelow and form the subject of the dependent claims.

The invention relates to a three-dimensional beamforming system for processing far-field broadband signals, comprising a planar transducer array, which is configured according to the positions of transducers at the aperture of the planar array and to the FIR filter coefficients, as defined in the above method of the present invention, which will be described in greater detail and claimed below.

Particularly, the invention relates to a three-dimensional filter-and-sum beamforming system as described above.

The invention also relates to a planar transducer array for receiving and/or transmitting broadband beams, configured according to the above method of the present invention, which will be described in greater detail and claimed below.

A further application of the present invention consists of an imaging system comprising a planar transducer array configured according to the above method of the present invention, which is described in greater detail and claimed below.

Yet another application consists of a communication system comprising a planar transducer array for receiving and/or transmitting broadband signals, configured according to the above method of the present invention, which will be described in greater detail and claimed below.

An application of the present invention also consists of a system for determining the direction of arrival of signals, comprising a planar transducer array for receiving broadband signals, configured according to the above method of the present invention, which is described in greater detail and claimed below.

Particularly, the present invention relates to a passive acoustic imaging system (known as acoustic camera) for mapping active acoustic sources in a predetermined region in space, which system has a planar transducer array configured according to the above method of the present invention, which is described in greater detail and claimed below.

Theoretical Background of the Invention

The following model and the mathematical expressions are based on a planar transducer array which lies on a plane $z=0$ in a three-dimensional reference system, and is composed of omnidirectional point transducers. Each transducer "n" of the planar array has a position in the plane $z=0$, which is defined by the coordinates $x_n$ and $y_n$. Each transducer "n" is connected to a FIR filter with a number L of coefficients.

The signal generated by the $n^{th}$ transducer $s_n(t)$ with $n \in [0, N-1]$ when a far field plane wave impinges thereupon may be described, as the delayed replica of the signal $s_c(t)$ generated by the transducer placed at the origin of the coordinate system ($x=0, y=0, z=0$), by the equation:

$$s_n(t) = s_c\left(t + \frac{r_n^T \hat{p}}{c}\right) \quad (1)$$

where $r_n = [x_n, y_n, 0]^T$ is the position vector of the $n^{th}$ position vector of the $n^{th}$ transducer and T designates the transposition operator.

C is wave propagation velocity.

The vector $\hat{p}$ is the unit vector perpendicular to the wavefront and directed toward the wave source. The components of the vector $\hat{p}$ are a function of the azimuth angle $\varphi$ and the angle of elevation $\theta$.

These angles define the direction of arrival of the wavefront according to the following equation:

$$\hat{p} = [p_x, p_y, p_z]^T = [\sin\theta \cos\varphi, \sin\theta \sin\varphi, \cos\theta]^T \quad (2)$$

A beamformer operating in data-independent filter-and-sum mode generates an output signal $b_{\hat{q}}(t)$ that depends on the beem-steering direction defined by the unit vector $\hat{q}$, as follows $$b_{\hat{q}}(t) = \sum_{n=0}^{N-1} \sum_{l=0}^{L-1} w_{n,l} s_n\left(t - \frac{r_n^T \hat{q}}{c} - lT_c\right) \quad (3)$$

where $w_{n,l}$ is a real quantity that represents the lth coefficient of the $n^{th}$ FIR filter and $T_c$ is the sampling interval. The elements of the unit vector $\hat{q}$ are functions of the azimuth angle $\varphi_0$ and the angle of elevation $\theta_0$ that define the steering direction according to the following equation:

$$\hat{q} = [q_x, q_y, q_z]^T = [\sin\theta_0 \cos\varphi_0, \sin\theta_0 \sin\varphi_0, \cos\theta_0]^T \quad (4)$$

Considering a monochromatic wave of frequency f impinging upon the planar transducer array, the signal of the transducer at the origin of the coordinate system is described as:

$$s_c(t) = \exp\{j2\pi ft\} \quad (5)$$

and hence the output signal of the beamformer is described by the following expression:

$$b_{\hat{q}}(t) = \sum_{n=0}^{N-1} \sum_{l=0}^{L-1} w_{n,l} \exp\left\{j2\pi f\left[t + \frac{x_n(p_x - q_x) + y_n(p_y - q_y)}{c} - lT_c\right]\right\}. \quad (6)$$

To avoid the need to account for the various combinations of unit vectors $\hat{p}$ and $\hat{q}$, new variables u and v are advantageously defined, as:

$$u = p_x - q_x$$
$$v = p_y - q_y \quad (7)$$

Therefore, for a given frequency f, the ideal beam pattern $B_i(u,v,f)$ is described by the following equation:

$$B_i(u, v, f) = \sum_{n=0}^{N-1} \sum_{l=0}^{L-1} w_{n,l} \exp\left\{j2\pi f\left(\frac{x_n u + y_n v}{c} - lT_c\right)\right\} \quad (8)$$

In order to account for imperfections of transducers, a time- and frequency-invariant complex random variable $A_n = a_n \exp(-j\gamma_n)$ may be introduced, which changes the gain $a_n$ and the phase $\gamma_n$ of the response of the $n^{th}$ transducer.

Therefore, the ideal definition of the beam pattern becomes:

$$B(u, v, f) = \sum_{n=0}^{N-1} \sum_{l=0}^{L-1} w_{n,l} A_n \exp\left\{j2\pi f\left(\frac{x_n u + y_n v}{c} - lT_c\right)\right\}. \quad (9)$$

In order to determine the configuration of the transducer array and the filters, the beam pattern must be calculated in relation to the three variables u, v and f.

The variables u, v represent combinations of the components of the unit vectors that define the steering direction and the direction from which the frontwave comes and, in order to ensure high performance of the method, the domain shall be limited to the strictly required range, whereby the steering directions are defined by a steering unit vector $\hat{q}$ with the components $q_x \in [q_{x,m}, q_{x,M}]$, $q_y \in [q_{y,m}, q_{y,M}]$ and $q_z \geq 0$, whereas the limits of the range are set in such a manner that $|q_x| \leq 1$ and $|q_y| \leq 1$.

In this case, the variables u, v are included in a rectangle defined as follows:

$$u \in [u_{min}, u_{max}]$$
$$v \in [v_{min}, v_{max}] \quad (10)$$

e with $$u_{min} = -1 - q_{x,M}$$
$$u_{max} = 1 - q_{x,m}$$
$$v_{min} = -1 - q_{y,M}$$
$$v_{max} = 1 - q_{y,m} \quad (11)$$

The beam pattern may be also expressed as a scalar product of products. In this notation, the coefficients of the FIR filters consist of the components of a vector w having a length M=NL whose element m is defined as $w(m) = w_{n,l}$ where $m \in [1, M]$ and $n = \lfloor (m-1)/L \rfloor$ and $l = \mathrm{mod}(m-1, L)$. The notation $\lfloor (m-1)/L \rfloor$ defines the greatest integer which is greater than or equal to $(m-1)/L$ whereas $\mathrm{mod}(m-1, L)$ is the remainder of the division $(m-1)/L$.

The notation of the equation (9) in vector form becomes:

$$B(u,v,f) = w^T g(u,v,f) \quad (12)$$

in which the components m of the vector $g(u,v,f)$ is defined by:

$$g(m) = A_n \exp\left\{ j 2\pi f \left( \frac{x_n u + y_n v}{c} - l T_c \right) \right\} \quad (13)$$

with the above defined relationships of m, n and l.

THE METHOD OF THE PRESENT INVENTION

In view of optimizing both the position of transducers at the aperture of the transducer array and the coefficients of the FIR filters, the method of the present invention includes minimization of the average value $J_e(w, x)$ of a cost function:

$$J(w, x) = \int_{f_{min}}^{f_{max}} \int_{u_{min}}^{u_{max}} \int_{v_{min}}^{v_{max}} H(u, v) |B(u, v, f)|^2 dv\, du\, df + \\ C \int_{f_{min}}^{f_{max}} |B(0, 0, f) - e^{-j 2\pi f \Delta}|^2 df \quad (14)$$

and hence minimization of the beam pattern energy in the domain of the variables u, v as defined in (10) in the range of frequencies from $f_{min}$ to $f_{max}$, whereby $$J_e(w, x) = E\{J(w, x)\} = \\ \int_{A_0} \cdots \int_{A_{N-1}} J(w, x) f_{A_0}(A_0) \cdots f_{A_{N-1}}(A_{N-1}) dA_{N-1} \cdots dA_0 \quad (15)$$

where:
x is the vector whose components are the positions of the transducers;

H(u,v) is a non-negative weighting function that allows sidelobe control. Thus, by assigning a greater weight to the energy of the sidelobes as compared with the weight assigned to the energy of the main lobe, the level of the sidelobes is reduced, in spite of the enlargement of the main lobe.

C is a real constant that controls balancing between minimization of the beam pattern energy and the steering direction matching the conditions in which the beam pattern modulus is 1 in the steering direction and the phase is linear. This has the purpose of ensuring that, in a steering direction, the signal that comes therefrom is only delayed, and is neither attenuated nor distorted;

$\Delta$ is a time delay associated with the linear phase of the beam pattern in the steering direction.

The coefficients $A_0, \ldots A_{N-1}$ define the characteristics of the individual transducers, as defined with reference to the equation (9), $f_{A_n}(A_n)$ being the probability density function of the random variable $A_n$.

With the optimization of the cost function average $J_e(w, x)$, computation becomes robust against fluctuations and errors.

Minimization is carried out in parallel with respect to vectors w and x.

While the function has a single minimum with respect to the vector w, as the positions are the argument of an exponential function, as shown by the previous beam-pattern defining equations, there is no way of analytically determining a local minimum and minimization requires the use of a stochastic algorithm.

Thus, concerning the minimization steps, one of them has the purpose of defining the arrangement of transducers at the aperture of the transducer array, thereby minimizing the cost function, i.e. the beam pattern energy.

Various algorithms may be used therefor, a stochastic iterative algorithm, known as Simulated annealing (SA), being described herein in detail. This prior art algorithm allows escape from local minima by iterative application of small random perturbations to state variables, and by acceptance of energy-increasing perturbations with a probability that decreases iteration by iteration. A detailed description of the SA algorithm is given in document [33].

In the case hereof, the energy function to be minimized is the function $$e(x) = \min_w \{J_e(w, x)\} \quad (16)$$

which is the function $J_e(w,x)$ minimized with respect to the vector whose components are the FIR filter coefficients, and the state variables for which the function has to be minimized are the components of the vector x of the transducer positions. At each iteration, all the transducers of the transducer array are processed according to a random sequence.

In the process according to the SA algorithm, the position of each transducer is perturbed by summing the coordinates of each $n^{th}$ transducer $x_n$ e $y_n$ with two random variables according to a zero-average and even-symmetry probability density function. Therefore, variables $x_n^*$ and $y_n^*$ are generated, for which the following conditions apply, to account for the physical size of the transducers and the maximum admitted aperture for the planar transducer array:

$$\sqrt{(x_n^* - x_i)^2 + (y_n^* - y_i)^2} > \varepsilon, \forall i \in [0, N-1], i \neq n$$

$$|x_n^*| < X_A/2$$

$$|y_n^*| < Y_A/2 \quad (17)$$

and where:

ε is the minimum admitted distance between transducers;

$X_A$ and $Y_A$ are the maximum lengths of the sides of the aperture, along the axis x and the axis y respectively.

Concerning the acceptance of the perturbations, as provided by the SA algorithm, in order to determine acceptability of perturbed variables $(x_n^*, y_n^*)$ the energy value $e(x^*)$ is calculated, where $x^*$ is the vector in which $(x_n^*, y_n^*)$ replace $(x_n, y_n)$. The perturbed position $(x_n^*, y_n^*)$ is accepted if the difference $e(x^*)-e(x)$ is less than zero. Otherwise, the perturbed position is accepted with a system temperature-dependent probability according to Boltzmann distribution:

$$Pr\{\text{accept}(x_n^*, y_n^*)\} = \exp\{[e(x^*)]/\kappa T\} \qquad (18)$$

where:

κ è Boltzmann's constant and T is the temperature of the current iteration. Temperature is an internal parameter of the SA algorithm, which starts from a given initial value and gradually decreases according to the inverse of the logarithm of the iteration index, until the final value is obtained, after a predetermined number of iterations.

With an appropriate selection of SA parameters and a given number of iterations, the final state of the vector x statistically approximates the argument of the global minimum. Since analytical minimization with respect to the components of the vector w, i.e. the FIR filter coefficients, is integrated in SA algorithm processing, as shown in Equation (16), it is carried out in parallel with minimization with respect to the components of the vector x, i.e. the positions of transducers. This will provide a better global minimum approximation of the cost function as compared with a two-step minimization process, with a first FIR filter coefficient optimization step, and a later position optimization step, or vice versa.

In addition, analytical determination of the optimal vector w dramatically reduces the computational load, as compared with the cases in which optimization for the components of the vectors w and x is only carried out by the SA algorithm.

The minimum of $J_e(w,x)$ with respect to the components of the vector w is advantageously determined starting from the cost function of the equation (14), expressed in matrix form in the integrals:

$$J(w,x) = \int_{f_{min}}^{f_{max}} \int_{u_{min}}^{u_{max}} \int_{v_{min}}^{v_{max}} H(u,v) w^T g(u,v,f)^* g(u,v,f)^T w \, dv \, du \, df + \qquad (19)$$

$$C \int_{f_{min}}^{f_{max}} w^T g(0,0,f)^* g(0,0,f)^T w - 2w^T \text{Re}\{g(0,0,f) e^{j2\pi f \Delta}\} + 1 \, df$$

with the following definitions:

$$G = \int_{f_{min}}^{f_{max}} \int_{u_{min}}^{u_{max}} \int_{v_{min}}^{v_{max}} H(u,v) g(u,v,f)^* g(u,v,f)^T dv \, du \, df + \qquad (20)$$

$$C \int_{f_{min}}^{f_{max}} g(0,0,f)^* g(0,0,f)^T df,$$

$$r = C \int_{f_{min}}^{f_{max}} \text{Re}\{g(0,0,f) e^{j2\pi f \Delta}\} df \qquad (21)$$

and $$d = C(f_{max} - f_{min}), \qquad (22)$$

The equation (19) may be expressed as follows:

$$J(w,x) = w^T G w - 2 r^T w + d \qquad (23)$$

whereas the average value $J_e(w,x)$ of the cost function is calculated by inserting the expression (23) into the equation (15), whereby $$J_e(w,x) = w^T G_e w - 2 r_e^T w + d \qquad (24)$$

where:

$G_e = E\{G\}$ and $r_e E\{r\}$.

Assuming that:

the characteristics $A_n$ of all the transducers are defined by the same probability density function $f_A(A)$;

the variables $a_n$ and $\gamma_n$ are independent random variables, whereby the common probability density function is separable $f_A(A) = f_a(a) f_\gamma(\gamma)$, where $f_a(a)$ is the probability density function of the gain and $f_\gamma(\gamma)$ is the probability density function of the phase;

$f_\gamma(\gamma)$ is an even function;

the average value of $a_n$ is 1, then the average values of G and r may be calculated as follows:

$$G_e = \begin{bmatrix} (1+\sigma_a^2)1_L & \mu_\gamma^2 1_L & \cdots & \mu_\gamma^2 1_L \\ \mu_\gamma^2 1_L & (1+\sigma_a^2)1_L & \cdots & \mu_\gamma^2 1_L \\ \vdots & \vdots & & \vdots \\ \mu_\gamma^2 1_L & \mu_\gamma^2 1_L & \cdots & (1+\sigma_a^2)1_L \end{bmatrix} \circ \overline{G} \qquad (25)$$

$$r_e = \mu_\gamma \overline{r} \qquad (26)$$

where:

$\sigma_a^2$ is the variance of the variable a;

the notation "∘" indicates the Hadamard product, $1_L$ is a L×L matrix of values 1 and the constant $\mu_\gamma$ is defined as follows:

$$\mu_\gamma = \int \cos(\gamma) f_\gamma(\gamma) d\gamma \qquad (27)$$

The terms $\overline{G}$ and $\overline{r}$ are similar to the terms G and r without the contribution of the random variables $A_n$:

$$\overline{G} = \int_{f_{min}}^{f_{max}} \int_{u_{min}}^{u_{max}} \int_{v_{min}}^{v_{max}} H(u,v) \overline{g}(u,v,f)^* \overline{g}(u,v,f)^T dv \, du + \qquad (28)$$

$$C \int_{f_{min}}^{f_{max}} \overline{g}(0,0,f)^* \overline{g}(0,0,f)^T df$$

$$\overline{r} = C \int_{f_{min}}^{f_{max}} \text{Re}\{\overline{g}(0,0,f) e^{j2\pi f \Delta}\} df \qquad (29)$$

and where the element m of the vector $\overline{g}(u,v,f)$ is defined by:

$$\overline{g}(m) = \exp\left\{j2\pi f\left(\frac{x_n u + y_n v}{c} - lT_c\right)\right\} \qquad (30)$$

Furthermore, the matrix $G_e$ may be decomposed into a real portion and an imaginary portion $G_e = G_{eR} + jG_{eI}$ and it will be easy to prove that, for each possible w, the imaginary portion is antisymmetric, i.e. $w^T G_{eI} w = 0$, whereas the real portion is positive semidefinite, i.e. $w^T G_{eR} w \geq 0$. Since for $w \neq 0$, $w^T G_{eR} w = 0$, only when the beam pattern modulus is zero over the whole domain of interest of the variables u,v and f, the matrix $G_{eR}$ is positive definite and hence invertible.

The optimized coefficients for the FIR filters $w_{opt}$ are the global minimum with respect to the vector w of the quadratic form of the equation (24) and may be calculated from:

$$w_{opt} = \underset{w}{\operatorname{argmin}}\{J_e(w, x)\} = G_{eR}^{-1} r_e \qquad (31)$$

While the method of the invention as described heretofore, as mentioned above, is already a progress in that it provides parallel optimization of both the positions of the transducers and the coefficients of the FIR filters by means of a stochastic algorithm and analytical computation respectively, the calculation of the triple integral of the equation (28) must be repeated for each perturbation of the transducer positions, as the vector g depends on the transducer position vector x. Furthermore, such triple integral must be calculated for each element of the matrix, whose dimensions are M×M. For this reason, a direct numerical calculation of the triple integral is not feasible in practice, even with a small number of transducers and coefficients.

As explained in detail below, the present invention affords a dramatic reduction of the computational load by recognizing that the computation of the value of said triple integral may be converted into reading of the correct values of two integral functions that may be numerically calculated once before starting the minimization process, which values are stored in a table. Thus, the method of the present invention becomes practically feasible and can be effectively used for configuration of planar arrays and the filter coefficients associated therewith.

Considering the equation (30), the equation (28) may be expressed as follows:

$$\overline{G} = (m_1, m_2) = \int_{f_{min}}^{f_{max}} \int_{u_{min}}^{u_{max}} \int_{v_{min}}^{v_{max}} H(u, v) \exp \qquad (32)$$
$$\left\{-j2\pi f\left[(x_{n_1} - x_{n_2})\frac{u}{c} + (y_{n_1} - y_{n_2})\frac{v}{c} + (l_2 - l_1)T_c\right]\right\}$$
$$dvdudf + C\int_{f_{min}}^{f_{max}} \exp\{-j2\pi f(l_2 - l_1)T_c\}df$$

where $m_1 \in [1,M]$, $m_2 \in [1,M]$ and the relation of $m_1$, $n_1$ and $l_1$ and of $m_2$, $n_2$ and $l_2$ is the relation defined for the components w(m) of the vector w introduced for the equation (12) that expresses the beam pattern as a vector product.

It will be apparent that the second integral does not depend on the position of the transducers and may be calculated once before starting a stochastic optimization procedure for optimizing the position of transducers, particularly the computation using the SA algorithm.

Concerning the first integral, which is a triple integral, referred to as $G_{m_1,m_2}^1$ and assuming that the function H(u,v) is a piecewise constant function on rectangular regions of the plane (u,v), this integral may be also expressed as:

$$G_{m_1,m_2}^I = \sum_{\phi=1}^{\Phi} \int_{f_{min}}^{f_{max}} \int_{u_{min}^\phi}^{u_{max}^\phi} \int_{v_{min}^\phi}^{v_{max}^\phi} H_\phi \exp\left\{-j2\pi f\left[(x_{n_1} - x_{n_2})\frac{u}{c} + \right.\right. \qquad (33)$$
$$\left.\left.(y_{n_1} - y_{n_2})\frac{v}{c} + (l_2 - l_1)T_c\right]\right\}$$
$$dvdudf$$
$$= \sum_{\phi=1}^{\Phi} G_\phi$$

where:

$\Phi$ is the number of rectangular regions into which the rectangle corresponding to the domain of the variables u, v is divided and $H_\Phi$ is the constant value of the function H(u,v) on the $\Phi^{th}$ region. This rectangle is defined as:

$$u \in [u_{min}^\phi, u_{max}^\phi]$$
$$v \in [v_{min}^\phi, v_{max}^\phi] \qquad (34)$$

Since the weighting function H(u,v) mainly has the function of differentiating the region of the main lobe from that of the side lobe, the sum in (33) generally comprises two regions only. Therefore, one element of the sum will be only considered below, by replacing the frequency integral for the two remaining integrals, then:

$$G_\phi = H_\phi \int_{u_{min}^\phi}^{u_{max}^\phi} \int_{v_{min}^\phi}^{v_{max}^\phi} \int_{f_{min}}^{f_{max}} \exp\{-j2\pi f(\tilde{x}u + \tilde{y}v + \tilde{k})\} df dv du \qquad (35)$$

where:

$$\tilde{x} = (x_{n_1} - x_{n_2})/c \qquad (36)$$
$$\tilde{y} = (y_{n_1} - y_{n_2})/c$$
$$\tilde{k} = (l_2 - l_1)T_c$$

By introducing an additional variable s with:

$$s = \tilde{x}u + \tilde{y}v + \tilde{k} \qquad (37)$$

the equation (35) may be expressed in definite form with the function F(s):

$$F(s) = \int_{f_{min}}^{f_{max}} \exp\{-j2\pi fs\} df = \frac{\exp\{-j2\pi f_{max}s\} - \exp\{-j2\pi f_{min}s\}}{-j2\pi fs} \qquad (38)$$
$$= (f_{max} - f_{min})\exp\{-j\pi(f_{max} + f_{min})s\}\operatorname{sinc}[(f_{max} - f_{min})s]$$

where:

$$\operatorname{sin} c(\alpha) = \sin(\pi\alpha)/\pi\alpha$$

The integral on v of equation (35) may be expressed and calculated like in the following equation (39):

$$\int_{v_{min}^\phi}^{v_{max}^\phi} F(\tilde{x}u + \tilde{y}v + \tilde{k}) dv =$$
$$\frac{1}{\tilde{y}} \int_{\tilde{x}u+\tilde{y}v_{min}^\phi+\tilde{k}}^{\tilde{x}u+\tilde{y}v_{max}^\phi+\tilde{k}} F(s) ds = \frac{1}{\tilde{y}}\left[F_1(\tilde{x}u + \tilde{y}v_{max}^\phi + \tilde{k}) - F_1(\tilde{x}u + \tilde{y}v_{min}^\phi + \tilde{k})\right]$$

where the function $F_1(.)$ in integral form is:

$$F_1(\alpha) = \int_0^\alpha F(\eta) d\eta \qquad (40)$$

the integral on the variable u may be calculated like the integral on v.

By introducing the two variables $s_m$ and $s_M$ defined as:

$$s_m = \tilde{x}u + \tilde{y}v_{min}^\phi + \tilde{k}$$

$$s_M = \tilde{x}u + \tilde{y}v_{max}^\phi + \tilde{k} \qquad (41)$$

$G_\phi$ may be calculated as follows:

$$G_\phi = H_\phi \int_{u_{min}^\phi}^{u_{max}^\phi} \int_{v_{min}^\phi}^{v_{max}^\phi} F(\tilde{x}u + \tilde{y}v + \tilde{k})dvdu = \qquad (42)$$

$$\frac{H_\phi}{\tilde{y}} \int_{u_{min}^\phi}^{u_{max}^\phi} F_1(\tilde{x}u + \tilde{y}v_{max}^\phi + \tilde{k}) - F_1(\tilde{x}u + \tilde{y}v_{min}^\phi + \tilde{k})du$$

$$= \frac{H_\phi}{\tilde{x}\tilde{y}} \left[ \int_{\tilde{x}u_{min}^\phi + \tilde{y}v_{max}^\phi + \tilde{k}}^{\tilde{x}u_{max}^\phi + \tilde{y}v_{max}^\phi + \tilde{k}} F_1(s_M)ds_M - \int_{\tilde{x}u_{min}^\phi + \tilde{y}v_{min}^\phi + \tilde{k}}^{\tilde{x}u_{max}^\phi + \tilde{y}v_{min}^\phi + \tilde{k}} F_1(s_m)ds_M \right] =$$

$$= \frac{H_\phi}{\tilde{x}\tilde{y}} [F_2(\tilde{x}u_{max}^\phi + \tilde{y}v_{max}^\phi + \tilde{k}) - F_2(\tilde{x}u_{min}^\phi + \tilde{y}v_{max}^\phi + \tilde{k}) + $$

$$- F_2(\tilde{x}u_{max}^\phi + \tilde{y}v_{min}^\phi + \tilde{k}) + F_2(\tilde{x}u_{min}^\phi + \tilde{y}v_{min}^\phi + \tilde{k})]$$

Like the function $F_1(.)$, the function $F_2(.)$ is defined by the following integral form:

$$F_2(\alpha) = \int_0^\alpha F_1(\eta)d\eta = \int_0^\alpha \int_0^\eta F(\xi)d\xi d\eta. \qquad (43)$$

When $\tilde{x}=0$, i.e. when $x_{n_1}=x_{n_2}$, $n_1 \neq n_2$ then the following is obtained:

$$G_\phi = \frac{H_\phi}{\tilde{y}}(u_{max}^\phi - u_{min}^\phi)[F_1(\tilde{y}v_{max}^\phi + \tilde{k}) - F_1(\tilde{y}v_{min}^\phi + \tilde{k})] \qquad (44)$$

whereas when $\tilde{y}=0$, i.e. $y_{n_1}=y_{n_2}$ and $n_1 \neq n_2$ the two integrals on u and v may be exchanged, thereby obtaining:

$$G_\phi = \frac{H_\phi}{\tilde{x}}(v_{max}^\phi - v_{min}^\phi)[F_1(\tilde{x}u_{max}^\phi + \tilde{k}) - F_1(\tilde{x}u_{min}^\phi + \tilde{k})] \qquad (45)$$

Finally, if both variables $\tilde{x}$ and $\tilde{y}$ are equal to zero, then $n_1 = n_2$ and the double integral on u and v leads to the following result:

$$G_\phi = H_\phi(u_{max}^\phi - u_{min}^\phi)(v_{max}^\phi - v_{min}^\phi)F(\tilde{k}) \qquad (46)$$

The above shows that $G_\phi$ may be calculated by summing four variables of the function $F_2(.)$ (see Equation (42)) and by summing values of the function $F_1(.)$ (see Equations (44) and (45) or in the case of $\tilde{x}=\tilde{y}=0$ from a definite form of the function (see Equation (46)). Furthermore, the functions $F_1(.)$ and $F_2(.)$ are independent of the positions of transducers in the transducer array, whereby these functions may be numerically calculated only once over a grid of a predetermined density of points and the values may be stored in a pair of tables. This operation may be carried out before minimization. During minimization, at each perturbation in the positions of transducers the elements of the matrix G may be changed by only accessing the memory in which the tables are stored and performing a small number of additions and multiplications.

It may be proved that even when the variables $\tilde{x}$ and $\tilde{y}$ are close to zero, Equations (42), (44) and (45) may be used.

The solution so obtained is an approximation, and a threshold value may be defined for the absolute values of the variables Y and 57.

It may be mathematically proved that when $\tilde{x}$ is close to zero and $|\tilde{x}|>|\tilde{x}|_{threshold}$, $G_\phi$ may be calculated using Equation (42), otherwise Equation (44) will be used. Likewise, when $\tilde{y}$ is close to zero and $|\tilde{y}|>|\tilde{y}|_{threshold}$, $G_\phi$ may be calculated using Equation (42), otherwise Equation (45) will be used.

The method of the invention will be better understood from a practical example of application of the results obtained from the above disclosed mathematical formalism. A configuration example of an acoustic imaging device will be now described with reference to the accompanying figures in which.

Figure 7A:
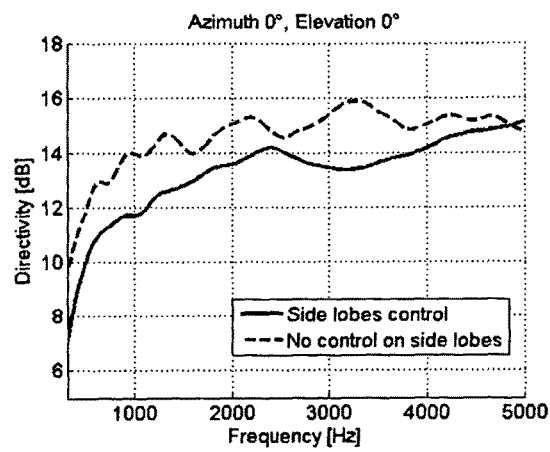
Figures 7B, 7C:
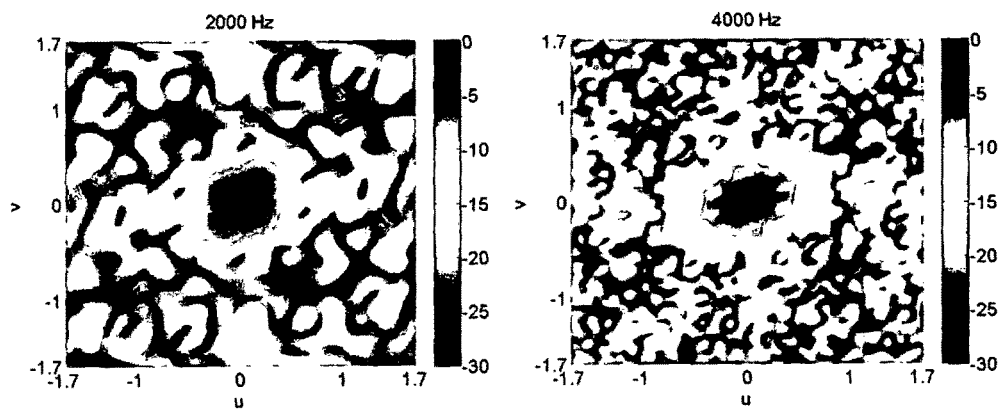
Figures 7D, 7E:
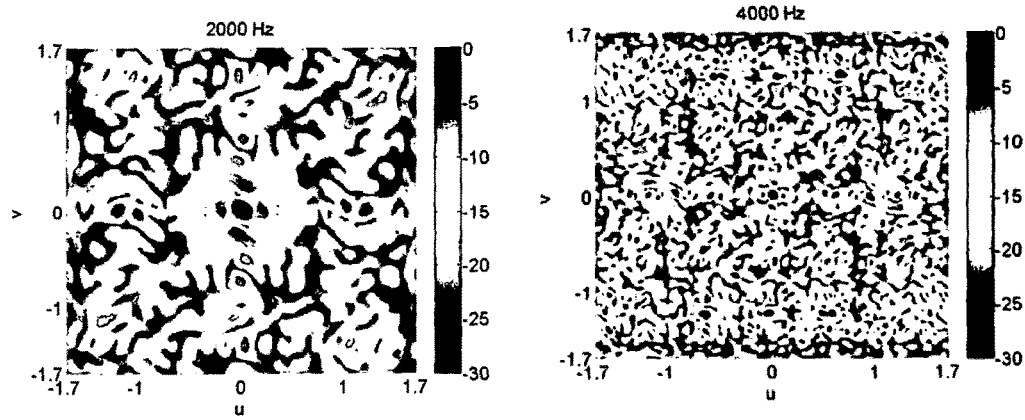

FIGS. 7a to 7e show a comparison of the results obtained with or without side lobe control, and particularly FIG. 7a shows directivity for broadside steering, FIG. 7b shows the beam pattern at 2 kHz with side lobe control, FIG. 7c shows the beam pattern at 4 kHz with side lobe control, FIG. 7d shows the beam pattern at 2 kHz without side lobe control, FIG. 7e shows the beam pattern at 4 kHz without side lobe control.

EXAMPLE

In the following example, the method of the invention was used to configure a planar transducer array for broadband signal processing by three-dimensional beamforming. The planar array has 1-meter long sides and s designed to detect acoustic waves in air. The array comprises N=32 omnidirectional microphones and the frequency range of the processed signals extends from $f_{min}=300$ Hz to $f_{max}=5$ kHz i.e. more than about four octaves. At the highest frequency, a usual planar transducer array of the same size would require 961 microphones disposed in the nodes of a 31×31 node grid, to avoid grating lobes in any steering direction. On the other hand, at the lowest frequency, the array has a size of 0.88λ with negligible directivity if no superdirectivity is provided. Therefore, the need and usefulness arises for a transducer array with an aperiodic configuration, that also has superdirectivity performances.

Due to the small number of microphones, the broadband transducer array may be conveniently used in the development of so-called passive acoustic cameras for mapping and capturing acoustic sources in a three-dimensional environment.

The structure of the filter-and-sum beamforming system includes 70th order FIR filers (L=71 coefficients) and a sampling frequency of 11 kHz. The delay associated with the linear phase of the beam pattern is set to half the order of the filters multiplied by the sampling period, i.e. to be equal to the group delay of each filter.

The region on the plane defined by the variables (u,v) in which the beam pattern is to be optimized has been determined by setting limits for the components of the steering vector, such as:

$$q_{x,M}=q_{y,M}=-q_{x,m}=-q_{y,m}=0.7.$$

Therefore, according to Equation (10) the region of interest was limited as follows:

$$u \in [-1.7, 1.7],$$

$$v \in [-1.7, 1.7]$$

Referring now to the parameters of the cost function, the constant C has been defined as having a value of 0.9 and the number of rectangular regions Φ in which the function H(u,v) is kept constant is 2.

In the first region, corresponding to the main lobe, the limits have been defined as follows:

$$u \in [-0.2, 0.2],$$

$$v \in [-0.2, 0.2]$$

The value of H(u,v) is set to $H_1 = -0.095$.

In the second region, corresponding to the side lobe, the limits have been defined as follows:

$$u \in [-1.7, 1.7],$$

$$v \in [-1.7, 1.7]$$

The value of H(u,v) is set to $H_2 = -0.1$.

The effect is that of weighting the main lobe region, i.e. the region in which the above defined rectangles overlap at 0.005 and weighting the side lobe region, i.e. the region in which such rectangles do not overlap at 0.1. This approach provides advantages in terms of computational load, because two rectangles are only needed (instead of five) for differentiated weighting of the main lobe and side lobe regions.

The values of the functions $F_1(\alpha)$ and $F_2(\alpha)$ have been calculated on a discretized grid of $10^6$ points within an interval $\alpha \in [-R, R]$, in which $R = (L-1)/T_c + (u_{max} X_A + v_{max} Y_A)/c = 0.0164$.

The probability distribution function for the gain and the phase of microphones has been considered as a Gaussian distribution with average values of 1 and 0 respectively and with standard deviations of 0.03 and 0.035 rad. In these conditions, the constant $\mu_\gamma$ has a value of 0.9994. These values have been set in accordance with experimental measurements performed on commercial microphone sets [34, 36]. The starting positions of the microphones have been randomly selected at the aperture of the transducer array, with a uniform probability density function. Perturbations of microphone positions were generated in both x and y directions, using a random variable whose probability density function is uniform, with average and maximum values of zero and 2.5 cm respectively. The minimum admitted distance ε between microphones was set to 3 cm. The Simulated Annealing procedure was carried out for $10^4$ iterations with initial and final temperatures of 1.5 and 0.005 respectively.

With the above parameters, computation lasted about ten hours using a MATLAB® system, with an Intel Xeon® processor operating at 2.93 GHz with 6 GB RAM. In spite of the small number of microphones and filter coefficients, the computation time was considerably long, and confirmed the problem as stated above, i.e. that optimization is practically unfeasible without the method of the invention.

In order to measure the robustness and performances of the designed array, in addition to beam pattern display, the following metrics was used: angular resolution estimated, based on the mail lobe width, as −3 dB;

directivity that measures the gain of the array against isotropic noise [2];

White Noise Gain (WNG), that measures the gain of the array with respect to spatially uncorrelated noise (i.e. the noise generated by the transducers of the array themselves) [2] and the Expected Beam Pattern Power (EBPP) which is the mean value of the squared beam pattern magnitudes and depends on the probability density functions for the gain and the phase of transducers [2].

The EBPP is useful to assess robustness of the beam pattern against errors concerning the knowledge of microphone characteristics and was calculated assuming a higher error magnitude than in the optimization step. Particularly, the standard deviations of the probability density functions for gain and phase were doubled, i.e. increased to 0.06 and 0.07 rad respectively.

The figures show the results of the above described example.

Figure 1:
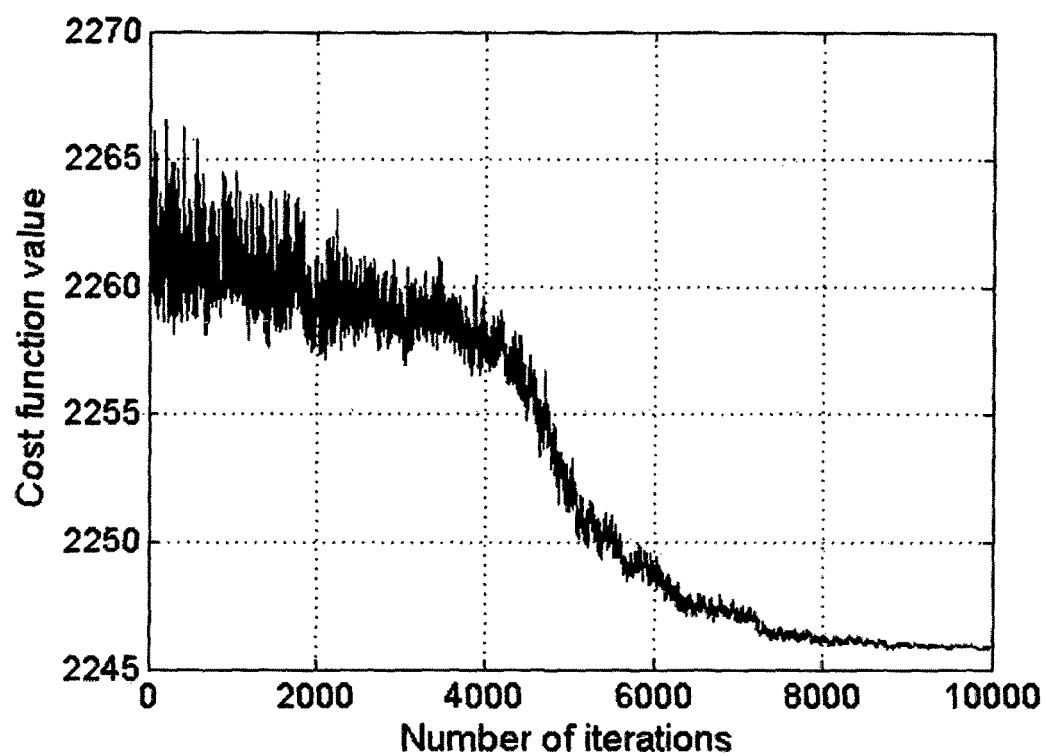
FIG. 1 shows the value of the cost function, as a function of the number of iteration steps.

FIG. 1 shows the behavior of the cost function with respect to the number of iterations of the inventive method steps. The cost function is exposed to random oscillations during the first iterations and gradually flattens out as temperature decreases until it reaches a stable solution.

Figure 2:
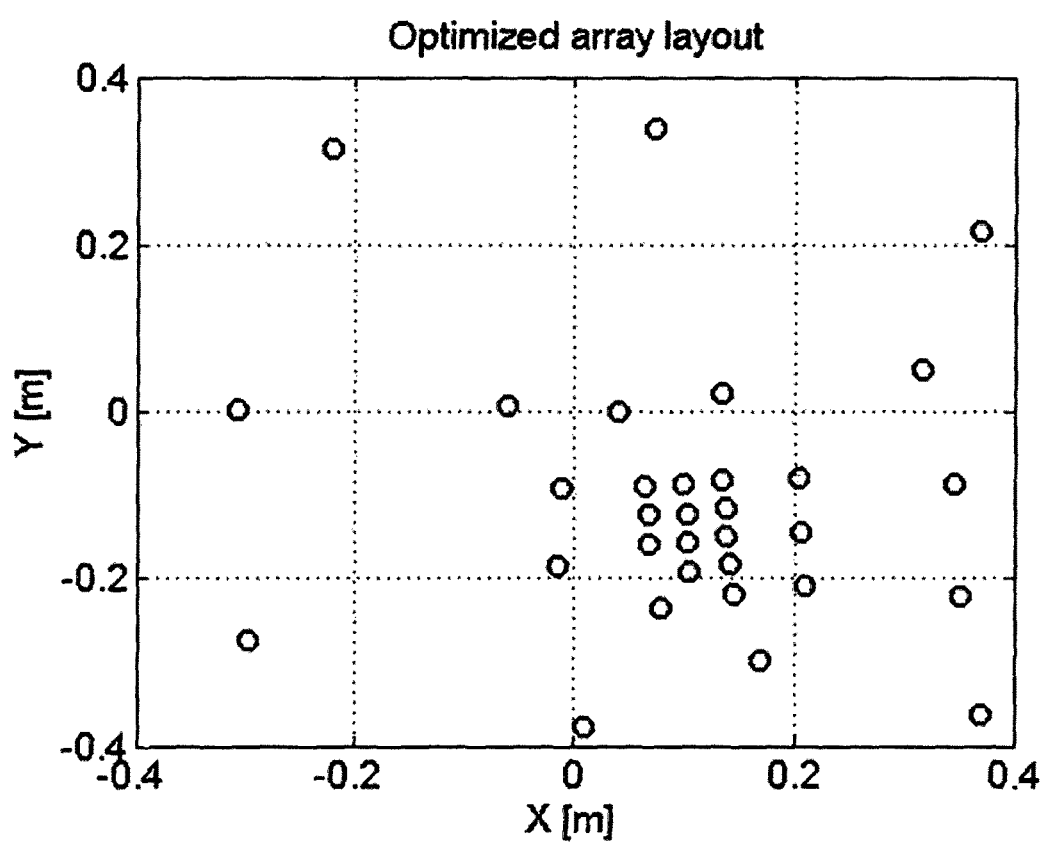
FIG. 2 shows a layout of an optimized planar array with an aperture of 80×80 cm.

FIG. 2 shows the optimized layout of the transducer array. It resembles a nested configuration reproducing a given distribution of transducers over different transducer subsets at different scales. The configuration does not use the maximum aperture (1m×1m) probably because the high subsampling factor promotes a more compact configuration to reduce side lobe energy.

Figure 4:
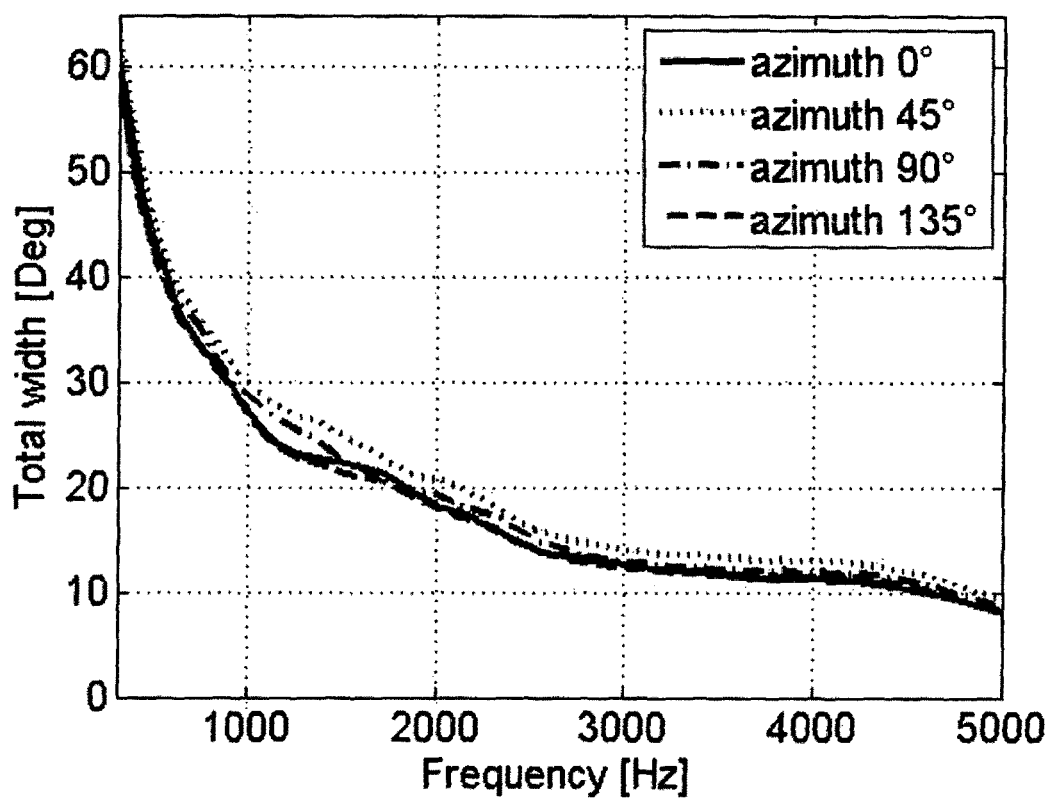
FIG. 4 shows the width of the main lobe when steering is perpendicular to the array (broadside steering), as measured at −3 dB with our different azimuth angles: 0°, 45°, 90°, 135°.
Figure 5A:
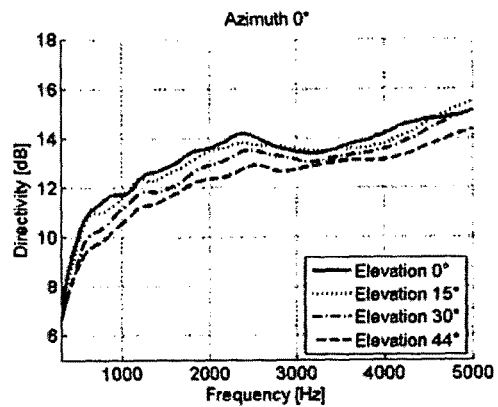
FIGS. 5a and 5d show directivity in relation to frequency with different steering angles, for a given azimuth angle and four angles of elevation, selected to cover the steering region and, particularly, in FIG. 5(a) azimuth angle=0°, in FIG. 5b azimuth angle=45°, in FIG. 5c azimuth angle=90° and in FIG. 5d azimuth angle=135°.
Figure 5B:
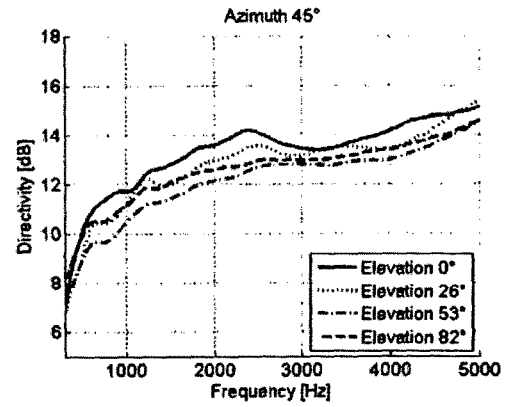
Figure 5C:
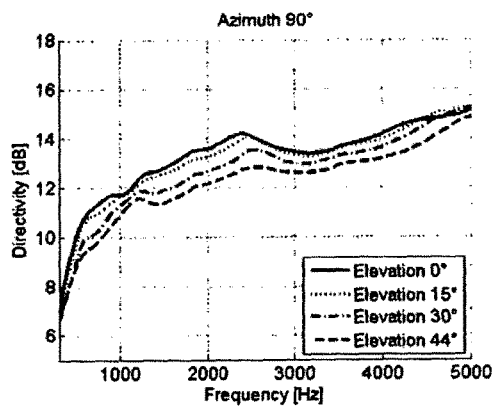
Figure 5D:
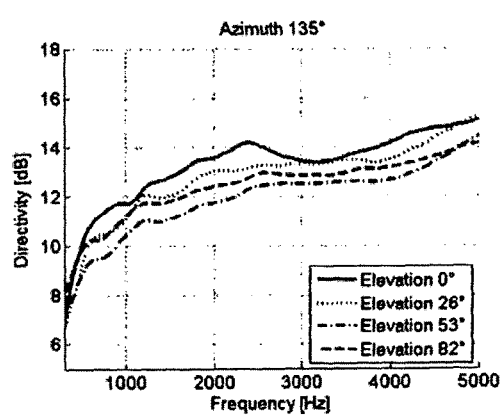

FIGS. 3(a) to 3(g) show the ideal beam pattern of the array obtained (FIG. 2) for different frequencies included in the relevant frequency range, i.e. the frequencies: 0.3, 0.65, 1, 2, 3, 4 and 5 kHz. As expected, the main lobe progressively decreases with frequency. This also appears in FIG. 4, which shows the amplitude of the main lobe, which results to be −3 dB when it has its side steered perpendicular to the array. Since the lobe is symmetric but not perfectly circular, the amplitude was measured for 4 azimuth angles φ=0°, 45°, 90°, 135°. The amplitude of the main lobe decreases monotonically approximately from 60° at 300 Hz to about 8° at 5 kHz and exhibits uniformity with respect to the azimuth.

The retraction of the main lobe with frequency also reflects on the directivity profiles, which have been measured for different steering directions and are shown in the charts of FIG. 5. Directivity was found to increase quasi-monotonically with frequency from 7 dB at 300 Hz to about 15 dB at 5 kHz. Referring to the steering directions, directivity generally decreases as the angle of elevation increases, i.e. when the main lobe is transversely deflected. The loss of directivity with steering does not exceed 2 dB and is mainly caused by the enlargement of the main lobe.

Figure 6:
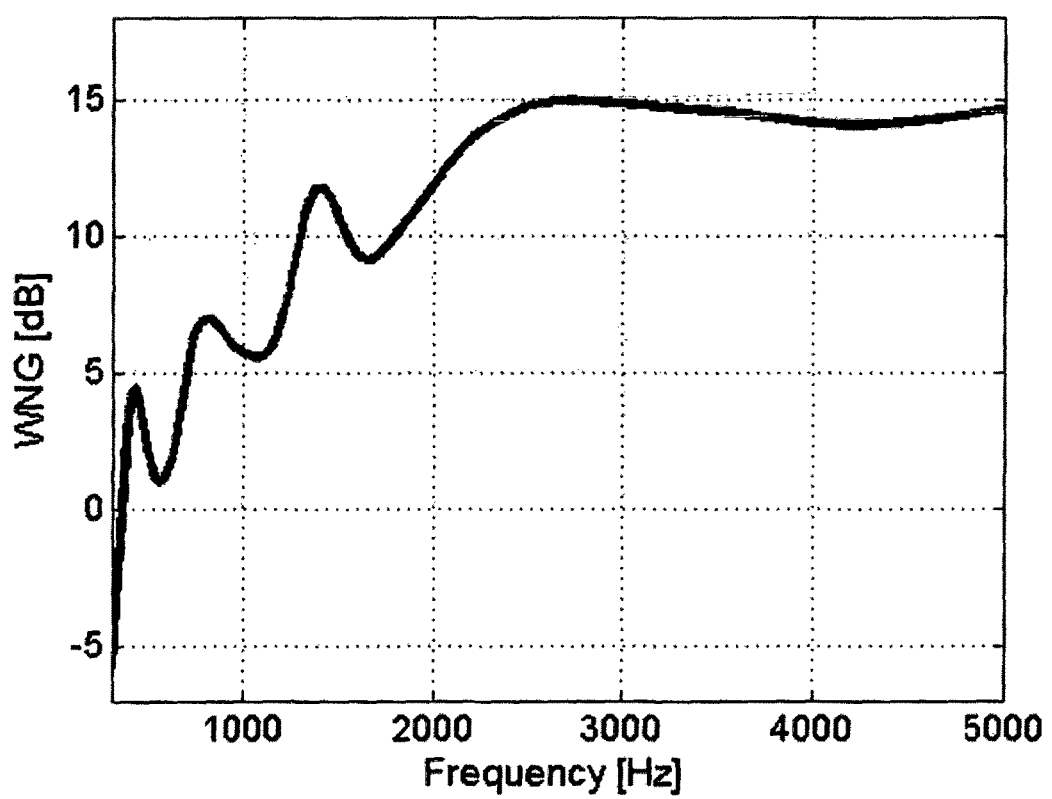
FIG. 6 shows the white noise gain versus frequency.

FIG. 6 shows the white noise gain, also known as WNG. This value oscillates in a frequency-dependent manner. The WNG value is greater than zero for almost the entire range of frequencies and involves an increase of the signal-to-noise ratio, with respect to self-generated noise. Only in a small low frequency band, i.e. from 300 to 350 Hz, WNG takes negative values, −5.5 dB at the lowest. Nevertheless, these values are not so low as to prevent practical operation of the transducer array-based system.

Figure 3A:
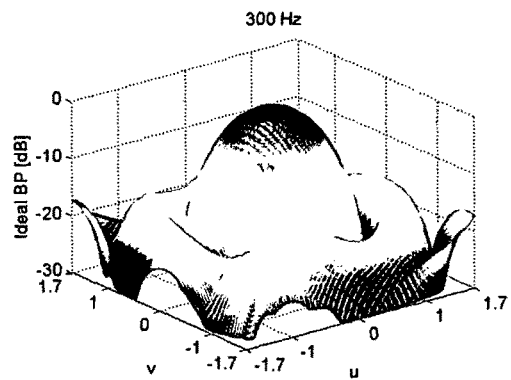
FIGS. 3a to 3i show the ideal beam pattern at the frequencies of 300 Hz, 650 Hz, 1 kHz, 2 kHz, 3 Khz, 4 kHz and 5 kHz respectively, and the expected beam power pattern (EBPP, which is the squared average value of the beam pattern) at 300 Hz and at 650 Hz respectively.
Figure 3B:
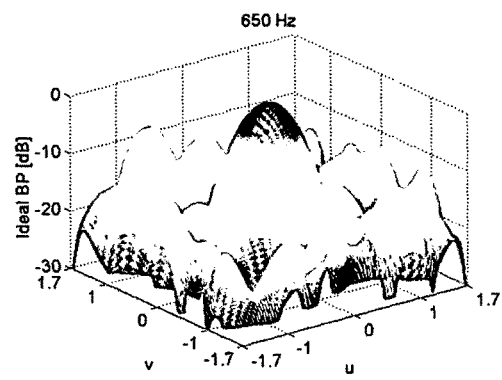
Figure 3C:
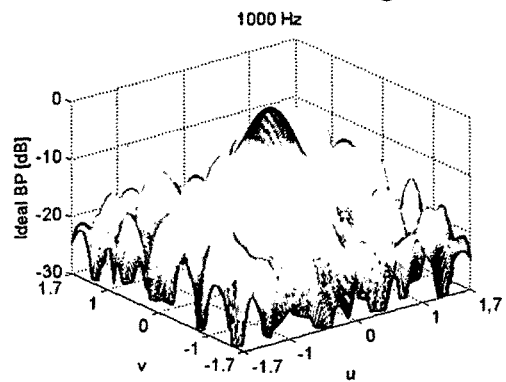
Figure 3D:
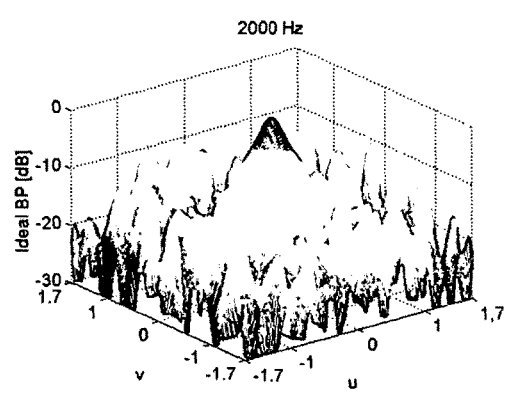
Figure 3E:
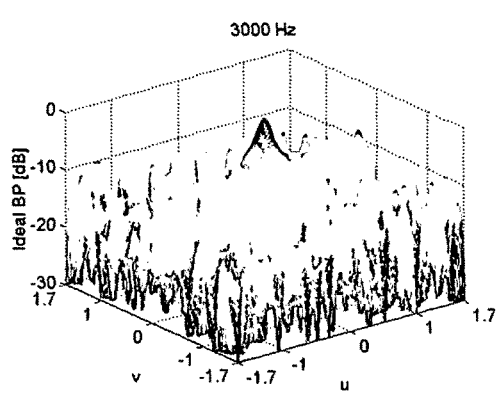
Figure 3F:
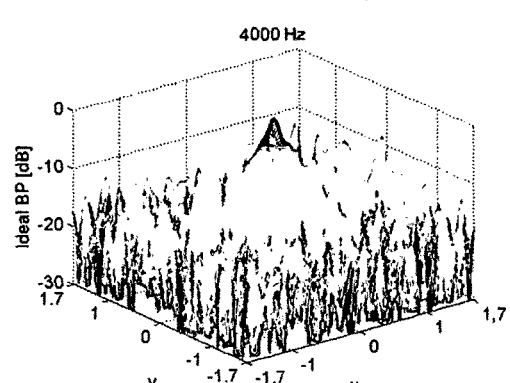
Figure 3G:
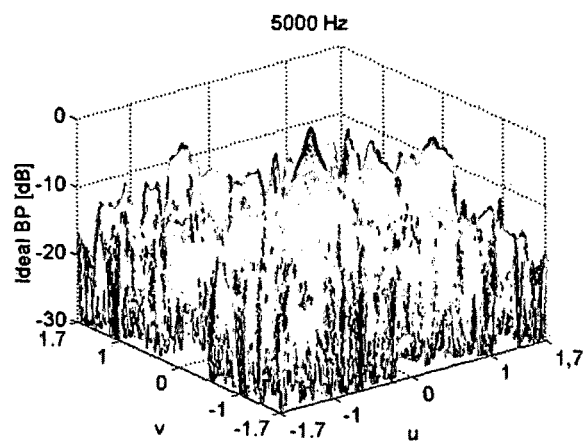
Figure 3H:
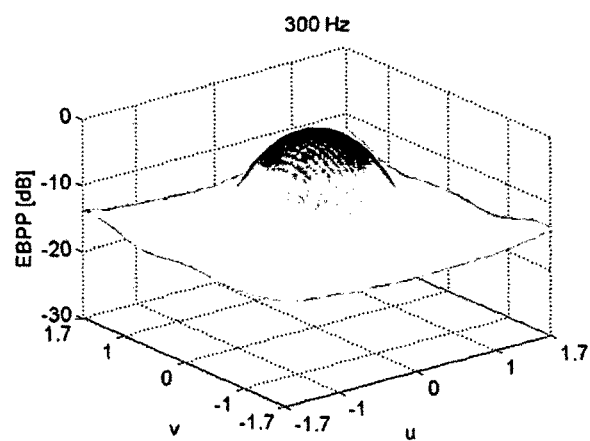
Figure 3I:
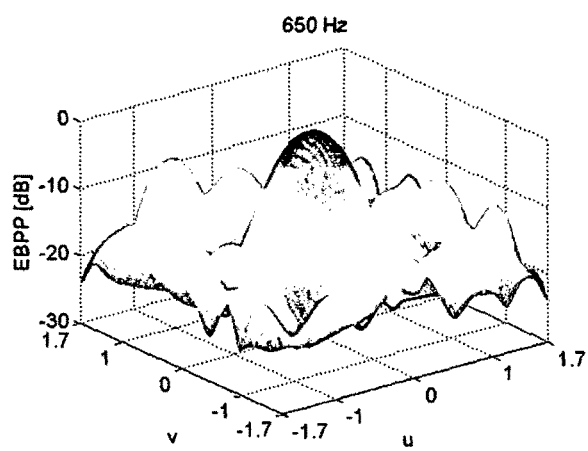

The robustness of the beam pattern was determined using the expected average beam pattern power values (EBPP). These are shown in FIGS. 3(h) and 3(i), in which two frequencies have been considered, i.e. 300 Hz and 650 Hz. The EBPP is generally characterized by a specific level, which is the inverse of the WNG and is defined as an "expected floor level", below which the beam pattern cannot decrease [2]. This is particularly evident at 300 Hz. Here, the EBPP has an expected floor level of about −14 dB. Referring to the ideal beam pattern, the EBPP at 300 Hz shows that the side lobes are flattened out by about 2 dB above the peak of the side lobe in the ideal case: conversely, at 650 Hz, the WNG is higher than 0 dB and a higher robustness is expected, with an expected floor level of about −24 dB, and with the EBPP very close to the ideal beam pattern. For frequencies from 1 to 5 kHz, the EBPP is substantially undistinguishable from the ideal beam pattern.

It should be further noted that side lobe level control is very important. A numerical analysis of the beam patterns of FIG. 3 shows that the level is generally lower than −10 dB and always lower than −7 dB. Side lobe values from −10 to −7 dB generally have a relative frequency of less than 1%, except at 5 kHz where relative frequency is less than 2%. Furthermore, the position of the side lobes whose level ranges from −10 to −7 dB is often close to the edges of the region (u,v) concerned. Therefore, these side lobes are included in visible region of the beam pattern and affect resolution only when the steering direction is far from the side, close to the maximum admitted deflection. For better understanding thereof, the design of the transducer array was repeated without introducing side lobe control and by setting a constant value of the function H(u,v) over the entire region, while maintaining the other parameters unchanged. FIG. 7(a) shows that the solution so obtained exhibits better directivity as compared with the previous solution in which no side lobe control was provided. Such better directivity results from a narrower main lobe, as shown in FIGS. 7(b) to 7(e), in which the beam patterns of both solutions are compared at 2 and 4 kHz. The main problem of the solution obtained without side lobe control consists in the presence of side lobes whose level frequently reaches −5 dB and sometimes even −3 dB. In spite of this better directivity, the concentration and level of these side lobes is unacceptable in almost every possible application of the transducer array. The above comparison confirms the importance of providing a mechanism for side lobe level control which implies specific side lobe energy weighting in the method of the present invention.

ADVANTAGES OF THE INVENTION

The above disclosure clearly shows that the method of the present invention affords effective and practical design of planar transducer array having a sparse aperiodic arrangement of transducer positions, and an associated filter-and-sum beamformer, which allows three-dimensional processing of far-field signals with spectra having a broad band of frequencies. The method limits the computational load and reduces the number of conventional transducers to be distributed at a small-size aperture of the transducer array, thereby allowing effective processing of signals over a very broad band of frequencies, and affording robust superdirectivity at low frequencies and avoiding grating lobes at high frequencies. Furthermore, the solution obtained with the inventive method is invariant with respect to the steering direction within a predetermined region. Thus, steering is obtained by only acting upon signal delays, while maintaining the layout of the transducer array and the FIR filters unchanged.

Concerning computational load, the huge load typically associated with these optimization problems, which has prevented the use of prior art methods heretofore, was limited by efficient computation by a multiple integral, which defines the beam pattern energy in the cost function for minimization thereof. This effect was obtained by combining it with the possibility of varying the steering direction and with side lobe control.

The invention also showed how a transducer array for a passive acoustic imaging system with a 0.3 to 5 kHz band, may be designed by only using 32 microphones arranged at a square aperture having 1-meter long sides.

REFERENCES

[1]: V. Murino, and A. Trucco, "Three-Dimensional Image Generation and Processing in Underwater Acoustic Vision," *The Proceedings of the IEEE*, vol. 88, pagg. 1903-1946, dicembre 2000.

[2]: H. L. Van Trees, *Optimum Array Processing, Part IV of Detection, Estimation, and Modulation Theory*, New York: Wiley, 2002

[3] M. Crocco, and A. Trucco, "Stochastic and Analytic Optimization of Sparse Aperiodic Arrays and Broadband Beamformers with Robust Superdirective Patterns," *IEEE Trans. Audio, Speech and Language Processing*, vol. 20, 16 pages, novembre 2012 (in stampa).

[4] R. C. Hansen, *Phased Array Antennas*, New York: John Wiley & Sons, 1998.

[5] H. Cox, R. Zeskind, and T. Kooij, "Practical Supergain," *IEEE Trans. Acoust. Speech, Signal Processing*, vol. ASSP-34, pagg. 393-398, giugno 1986.

[6] J. M. Kates, "Superdirective Arrays for Hearing Aids," *Jour. Acoust. Soc. Am.*, vol. 94, pagg. 1930-1933, ottobre 1993.

[7] J. Bitzer, and K. U. Simmer, "Superdirective Microphone Arrays," *Microphone Arrays: Signal Processing Techniques and Applications*, M. S. Brandstein and D. B. Ward, Eds. New York: Springer-Verlag, 2001, pagg. 19-38.

[8] S. Doclo, and M. Moonen, "Superdirective Beamforming Robust Against Microphone Mismatch," *IEEE Trans. Audio, Speech, and Lang. Proc.*, vol. 15, pagg. 617-631, febbraio 2007.

[9] S. Doclo, and M. Moonen, "Design of Broadband Beamformers Robust Against Gain and Phase Errors in the Microphone Array Characteristics," *IEEE Trans. Signal Processing*, vol. 51, pagg. 2511-2526, ottobre 2003.

[10] Y. R. Zheng, R. A. Goubran, M. El-Tanany, and H. Shi, "A Microphone Array System for Multimedia Applications With Near-Field Signal Targets," *IEEE. Sensors Journal*, vol. 5, pagg. 1395-1406, December 2005.

[11] A. Trucco, M. Crocco, and S. Repetto, "A Stochastic Approach to the Synthesis of a Robust, Frequency-Invariant, Filter-and-Sum Beamformer," *IEEE Trans. Instrument. and Meas.*, vol. 55, pagg. 1407-1415, agosto 2006.

[12] H. Chen, W. Ser, and Z. L. Yu, "Optimal Design of Nearfield Wideband Beamformers Robust Against Errors in Microphone Array Characteristics," *IEEE Trans. Circuit and Systems*, vol. 54, pagg. 1950-1959, settembre 2007.

[13] E. Mabande, A. Schad, and W. Kellermann, "Design of Robust Superdirective Beamformer as a Convex Optimization Problem," *Proc. IEEE Int. Conf. Acoustics, Speech and Signal Proc. (ICASSP-09)*, Taipei, Taiwan, 2009, pagg. 77-80.

[14] M. Crocco, and A. Trucco, "The Synthesis of Robust Broadband Beamformers for Equally-Spaced Linear Arrays," *Journal of Acoustical Society of America*, vol. 128, pagg. 691-701, agosto 2010.

[15] M. Crocco, and A. Trucco, "A Computationally Efficient Procedure for the Design of Robust Broadband Beamformers," *IEEE Trans. Signal Processing*, vol. 58, pagg. 5420-5424, ottobre 2010.

[16] M. Crocco, and A. Trucco, "Design of Robust Superdirective Arrays with a Tunable Tradeoff Between Directivity and Frequency-Invariance," *IEEE Trans. Signal Processing*, vol. 59, pagg. 2169-2181, maggio 2011.

[17] H. Chen, and W. Ser "Design of Robust Broadband Beamformers With Passband Shaping Characteristics Using Tikhonov Regularization," *IEEE Trans. Audio, Speech, and Lang. Proc.*, vol. 17, pagg. 665-681, maggio 2009.

[18] I. Kodrasi, T. Rohdenburg, S. Doclo, "Microphone Position Optimization for Planar Superdirective Beamforming, *Proc. IEEE Int. Conf. Acoustics, Speech and Signal Proc. (ICASSP-11)*, Prague, Czech Republic, 2011, pagg. 109-112.

[19] M. Crocco, and A. Trucco, "The Synthesis of Robust Broadband Beamformers for Equally-Spaced Linear Arrays," *Journal of Acoustical Society of America*, vol. 39, pagg. 1178-1187, agosto 1991.

[20] G. Oliveri, and A. Massa, "Bayesian Compressive Sampling for Pattern Synthesis with Maximally Sparse Non-Uniform Linear Arrays," *IEEE Trans. Antennas Propagation*, vol. 59, pagg. 467-481, febbraio 2011.

[21] W. Zhang, L. Li, and F. Li, "Reducing the Number of Elements in Linear and Planar Antenna Arrays With Sparseness Constrained Optimization," *IEEE Trans. Antennas Propagation*, vol. 59, pagg. 3106-3111, agosto 2011.

[22] R. L. Haupt, "Thinned Array Using Genetic Algorithms," *IEEE Trans. Antennas and Propagation*, vol. 42, pagg. 993-999, luglio 1994.

[23] K. S. Chen, X. H. Yun, Z. S. He, and C. L. Han, "Synthesis of sparse planar arrays using modified real genetic algorithm," *IEEE Trans. Antennas Propag.*, vol. 55, pagg. 1067-1073, aprile 2007.

[24] V. Murino, A. Trucco, and C. S. Regazzoni, "Synthesis of Unequally Spaced Arrays by Simulated Annealing," *IEEE Trans. Signal Processing*, vol. 44, pagg. 119-123, gennaio 1996.

[25] A. Trucco, "Thinning and Weighting of Large Planar Arrays by Simulated Annealing," *IEEE Trans. Ultrasonics, Ferroelectrics, and Frequency Control*, vol. 46, pagg. 347-355, marzo 1999.

[26] P. J. Bevelacqua, and C. A. Balanis, "Geometry and Weight Optimization for Minimizing Sidelobes in Wideband Planar Arrays," *IEEE Trans. Antennas Propag.*, vol. 57, pagg. 1285-1289, aprile 2009

[27] B. P. Kumar, and G. R. Branner, "Generalized analytical technique for the synthesis of unequally spaced arrays with linear, planar, cylindrical or spherical geometry," *IEEE Trans. Antennas Propag.*, vol. 53, pagg. 621-634, febbraio 2005.

[28] O. Quevedo-Teruel, and E. Rajo-Iglesias, "Ant Colony Optimization in Thinned Array Synthesis With Minimum Sidelobe Level," *IEEE Antennas and Wireless Propag. Letters*, vol. 5, pagg. 349-352, decembre 2006.

[29] S. Holm, B. Elgetun, and G. Dahl, "Properties of the Beampattern of Weight- and Layout-Optimized Sparse Arrays," *IEEE Trans. Ultrason., Ferroelect., and Freq. Contr.*, vol. 44, pagg. 983-991, settembre 1997.

[30] D. B. Ward, R. A. Kennedy, and R. C. Williamson, "Theory and Design of Broadband Sensor Arrays with Frequency-Invariant Far-Field Beam Pattern," *Jour. Acoust. Soc. Am.*, vol. 97, pagg. 1023-1034, febbraio 1995.

[31] Z. G. Feng, K. F. C. Yiu, and S. E. Nordholm, "Placement Design of Microphone Arrays in Near-Field Broadband Beamformers," *IEEE Trans. Signal Processing*, vol. 60, pagg. 1195-1204, marzo 2012.

[32] T. J. Mueller, editor, *Aeroacoustic Measurements*, Berlin: Springer-Verlag, 2002.

[33] S. Kirkpatrick, C. D. Gellat, Jr, and M. P. Vecchi, "Optimization by simulated annealing," *Science*, vol. 220, pagg. 671-680, maggio 13, 1983.

[34] I. Tashev, "Beamformer Sensitivity to Microphones Manufacturing Tolerances," *19th int. Conf. Systems for Automation of Engineering and Research SAER* 2005, St. Konstantin Resort, Bulgaria, settembre 2005.

[35] S. Orlando, A. Bale, and D. Johnson, "Design and preliminary testing of a MEMS microphone phased array," in *Proc. Berlin Beamforming Conf.*, Berlin, Germany, 2010, 8 pagine.

[36] F. Traverso, M. Crocco, and A. Trucco, "Estimating the performance of a superdirective microphone array with a frequency-invariant response," *Proc. 6th IEEE Sensor Array and Multichannel Signal Processing Workshop*, Jerusalem-Tel-Aviv (Israel), pagg. 5-8, ottobre 2010.

The invention claimed is:

1. A method of configuring planar transducer arrays for broadband signal processing by 3D beamforming, comprising:

combining a superdirective beamforming technique for low-frequency signal components with a sparse and aperiodic array pattern for high-frequency components in a predetermined frequency range; and optimizing positions of individual transducers at an aperture of a planar transducer array and FIR filter coefficients in parallel, by a hybrid iterative process including an analytical calculus determining the FIR filter coefficients and a stochastic calculus determining the positions of the individual transducers at the aperture of the planar transducer array, by minimizing a cost function, wherein the method further comprises:

causing the cost function to express a beam pattern as a function of the FIR filter coefficients and the positions of the individual transducers at the aperture of the planar transducer array, the cost function comprising a triple integral over a frequency range and over a range of values of two variables, the two variables being a linear combination of each of two components of vectors p and q that define a beam-steering direction, and a direction of an incident wavefront vector, which is perpendicular to a wavefront and is generated at a point coinciding with a wavefront source; and minimizing in parallel the cost function with respect to the positions of the individual transducers and the FIR filter coefficients;

wherein the step of minimizing is carried out in parallel and iteratively, using a stochastic method for the positions of the individual transducers and an analytical method for the FIR filter coefficients, and wherein said cost function is expressed by transformation and replacement of variables with two functions independent of the positions of the individual transducers, said cost functions having values that are determined on a predetermined grid of points with a given density of nodes before the step of minimizing, are stored in a table and are read from said table for computation of the cost function during the step of minimizing.

2. The method as claimed in claim 1, wherein:
a) defining the following variables:

$$u = p_x - q_x$$

$$v = p_y - q_y$$

where $p_x$, $p_y$ and $q_x$, $q_y$ are the two components of the vectors p and q, the planar transducer array being contained in a plane z=0 of a three-dimensional Cartesian coordinate system;
b) defining a cost function as an energy of the beam pattern (BP) for any combination of steering direction q and a wavefront direction p over a predetermined range of values of the variables u,v and over an entire frequency range f∈[$f_{min}$, $f_{max}$] of a band provided as a triple integral of the beam pattern expressed as a function of the variables u,v and frequency and positions $x_n,y_n$ of the individual transducers n at the aperture of the planar transducer array and FIR filter coefficients $w_{n,l}$ for each transducer, the triple integral being executed on the variables u,v and a frequency;
c) calculating a minimum of the cost function according to the FIR filter coefficients and $w_{n,l}$ and according to the positions $x_n,y_n$ of the individual transducers, by parallel use of an analytical computation for determining the FIR filter coefficients and a stochastic algorithm for determining the positions of the individual transducers, each iteration step of a stochastic algorithm, by which the minimum of the cost function is determined according to the positions of the individual transducers, involving the computation of FIR filter coefficient values which minimize the cost function with reference to the positions of the individual transducers as determined in a current iteration step of the stochastic algorithm, said steps being repeated for a predetermined number of iterations; and
d) computing a value of the cost function according to the integral as defined in step c) by transformation of the cost function into a combination of two functions independent of the positions of the individual transducers, and computing values of said two functions over a discretized grid of values, having a predetermined node density, the values of which correspond to variable values that are functions of the positions of the individual transducers,
wherein the step of computing is executed only once before minimizing the cost function, results of the step of computing being stored in tables and recalled for calculating the cost function value during minimization thereof, by transformation of said cost function value calculation into a combination of additions and multiplications of numerical table values.

3. The method as claimed in claim 2, wherein the variable values of step d) are linear functions of the positions of the individual transducers.

4. The method as claimed in claim 2, further comprising a step of calculating a mean value $J_e$ of the cost function J, the mean value being determined by considering a probability density function $f_{An}(A_n)$ for characteristics $A_n$ of the individual transducers, the characteristics $A_n$ of the individual transducers being expressed by a complex random variable for each transducer of the planar transducer array, the complex random variable being constant with time and frequency, and being a function of phase and gain response of each transducer, said cost function mean value being defined by the following equation:

$$J_e = \int_{A_0} \cdots \int_{A_{n-1}} Jf_{A0}(A_0) \cdots f_{A_{N-1}}(A_{N-1}) dA_{N-1} \cdots dA_0.$$

5. The method as claimed in claim 2, further comprising a step of carrying out side lobe level controls with respect to a main lobe level, the side lobe level controls consisting of a function H(u, v) of combination variables of the two components of the vectors p and q, a value of the function H(u, v) being multiplied by the beam pattern energy function in the cost function and having different values at least different regions contained in a domain of the variables u,v.

6. The method as claimed in claim 5, wherein the domain of the variables u,v is divided into a plurality of regions Φ, at which a secondary lobe control function has various different constant values within a same region, the cost function being calculated as a sum of the cost functions in the plurality of regions Φ with different values for the function H(u, v).

7. The method as claimed in claim 2, wherein the stochastic algorithm for calculating the positions of the individual transducers for cost function minimization is a Simulated Annealing algorithm, which iteratively optimizes the positions of the individual transducers by iterative application of random perturbations.

8. A three-dimensional beamforming system for processing far-field broadband signals, comprising:
a planar transducer array, which is configured according to positions of individual transducers at an aperture of a planar array and to FIR filter coefficients, as claimed in claim 1.

9. A planar transducer array for receiving and transmitting broadband beams in an imaging system, a communication system, a system determining signal directions, or a passive acoustic imaging system in an acoustic camera for mapping active acoustic sources in a predetermined region in space, the planar transducer array being configured to operate with a method as follows:
combining a superdirective beamforming technique for low-frequency signal components with a sparse and aperiodic array pattern for high-frequency components in a predetermined frequency range; and
optimizing positions of individual transducers at an aperture of the planar transducer array and FIR filter coefficients in parallel, by a hybrid iterative process including an analytical calculus determining the FIR filter coefficients and a stochastic calculus determining the positions of the individual transducers at the aperture of the planar transducer array, by minimizing a cost function,
wherein the method further comprises:
causing the cost function to express a beam pattern as a function of the FIR filter coefficients and the positions of the individual transducers at the aperture of the planar transducer array, the cost function comprising a triple integral over a frequency range and over a range of values of two variables, the two variables being a linear combination of each of two components of vectors p and q that define a beam-steering direction, and a direction of an incident wavefront vector, which is perpendicular to a wavefront and is generated at a point coinciding with a wavefront source; and minimizing in parallel the cost function with respect to the positions of the individual transducers and the FIR filter coefficients;

wherein the step of minimizing is carried out in parallel and iteratively, using a stochastic method for the positions of the individual transducers and an analytical method for the FIR filter coefficients, and wherein said cost function is expressed by transformation and replacement of variables with two functions independent of the positions of the individual transducers, said cost functions having values that are determined on a predetermined grid of points with a given density of nodes before the step of minimizing, are stored in a table and are read from said table for computation of the cost function during the step of minimizing.

10. The planar transducer array as claimed in claim 9, wherein the planar transducer array has 1 meter-long sides, with 32 transducers arranged in a sparse and aperiodic pattern thereon, whose positions are determined using the method as claimed in claim 1, the planar transducer array being adapted to process acoustic signals over a frequency range from 300 Hz to 5 kHz, each transducer having a 70th order FIR filter connected thereto and a sampling frequency of 11 kHz, and being part of a filter and sum beamformer.

* * * * *